United States Patent [19]
King et al.

[11] Patent Number: 5,274,729
[45] Date of Patent: Dec. 28, 1993

[54] UNIVERSAL OPTICAL FIBER BUILDOUT SYSTEM

[75] Inventors: Wilton W. King, Chamblee; Daniel L. Stephenson, Norcross; Ruben Travieso, Alpharetta, all of Ga.

[73] Assignee: AT&T Bell Laboratories, Murray Hill, N.J.

[21] Appl. No.: 924,687

[22] Filed: Jul. 30, 1992

[51] Int. Cl.⁵ .............................. G02B 6/36
[52] U.S. Cl. .................... 385/134; 385/53; 385/55; 385/59
[58] Field of Search .............. 385/53, 55, 56, 58, 385/59, 60, 70, 71, 72, 73, 89, 134, 135, 139, 140

[56] References Cited

U.S. PATENT DOCUMENTS

| | | | |
|---|---|---|---|
| 4,793,683 | 12/1988 | Cannon, Jr. et al. | 385/60 |
| 4,852,963 | 8/1989 | Lampert | 385/60 |
| 4,902,094 | 2/1990 | Shank | 385/55 |
| 5,067,783 | 11/1991 | Lampert | 385/60 |
| 5,073,042 | 12/1991 | Mulholland et al. | 385/56 X |
| 5,082,345 | 1/1992 | Cammons et al. | 385/60 |
| 5,093,885 | 3/1992 | Anton | 385/134 |
| 5,127,082 | 6/1992 | Below et al. | 385/135 |
| 5,129,023 | 7/1992 | Anderson et al. | 385/70 |

Primary Examiner—John D. Lee
Attorney, Agent, or Firm—Edward W. Somers; Michael A. Morra

[57] ABSTRACT

In order to mount optical fiber connectors in a panel (22), the panel is provided with a plurality of openings in each of which is disposed a buildout system. Each buildout system includes a buildout block each having a portion disposed on a rear side of the panel and adapted to have an optical fiber connector assembled thereto. Any one of three buildout blocks may be used in order to receive a desired connector which may be an ST, SC, or FC connector. Secured through a latching arrangement to the portion of the buildout block on a front side of the panel is a buildout which may have any one of three configurations to accept any one of the three connectors. The latching arrangement between buildout block and buildout is the same for any combination of buildout block and buildout. As a result of the structure of the buildout system, a buildout and a buildout block may be selected to connect any combination of the connectors.

17 Claims, 13 Drawing Sheets

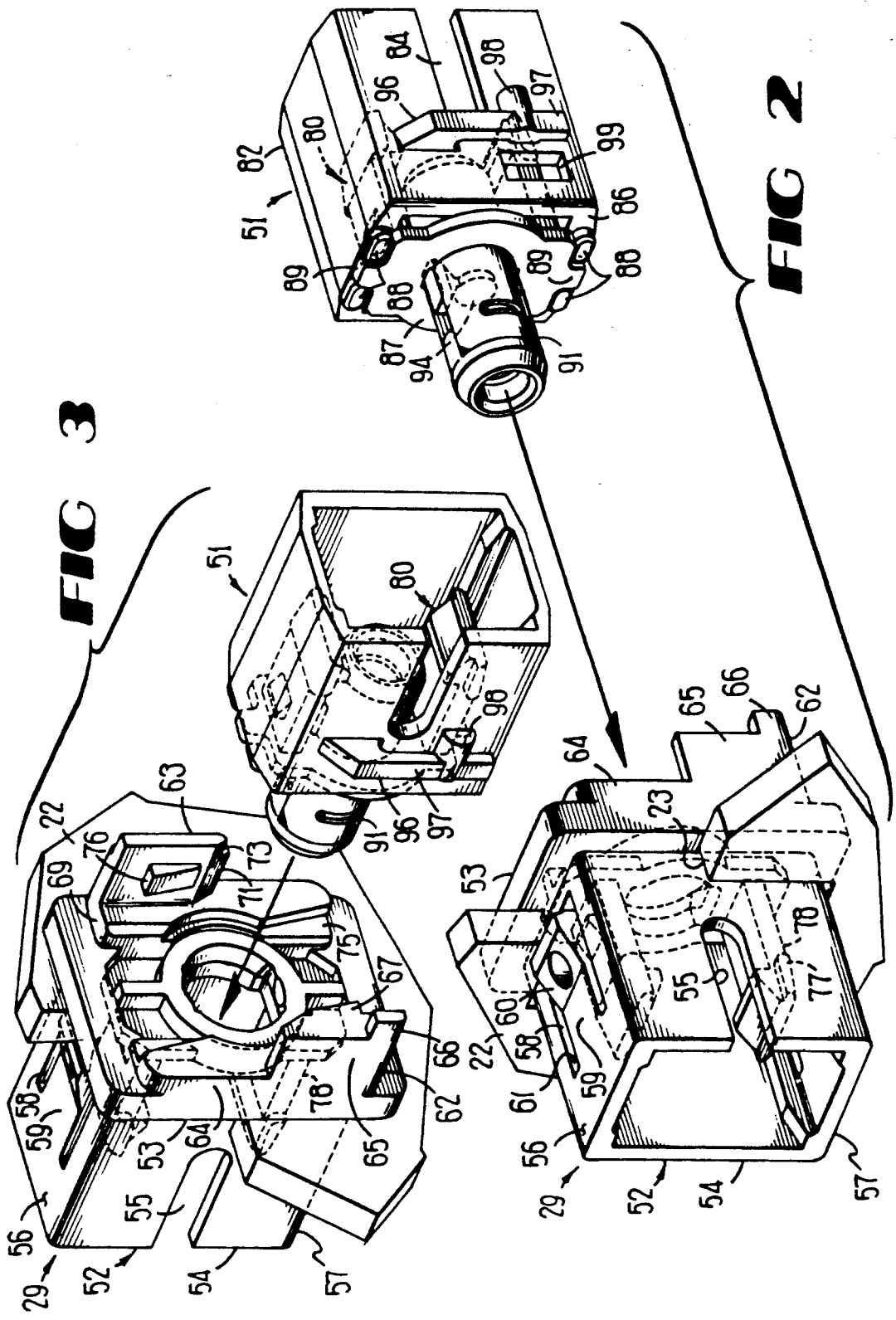

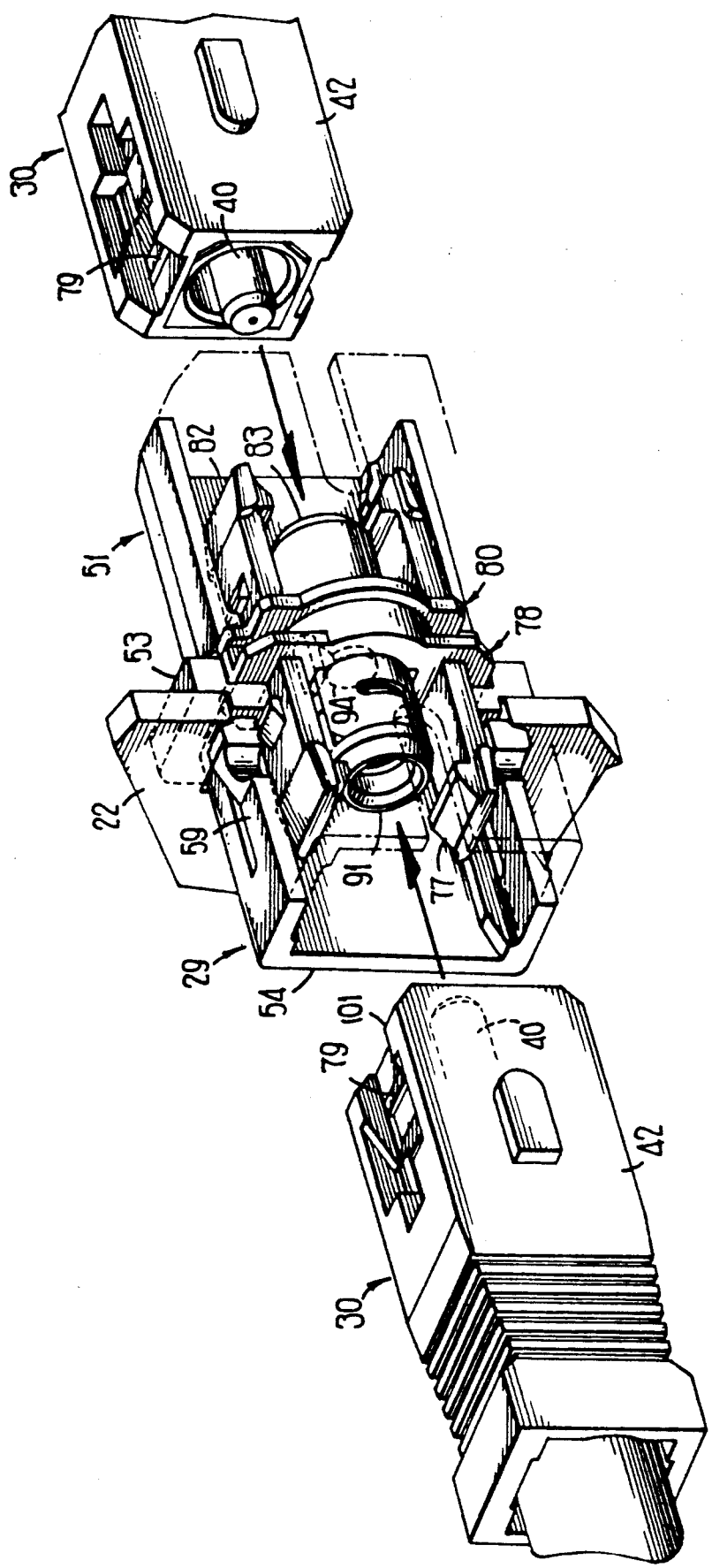

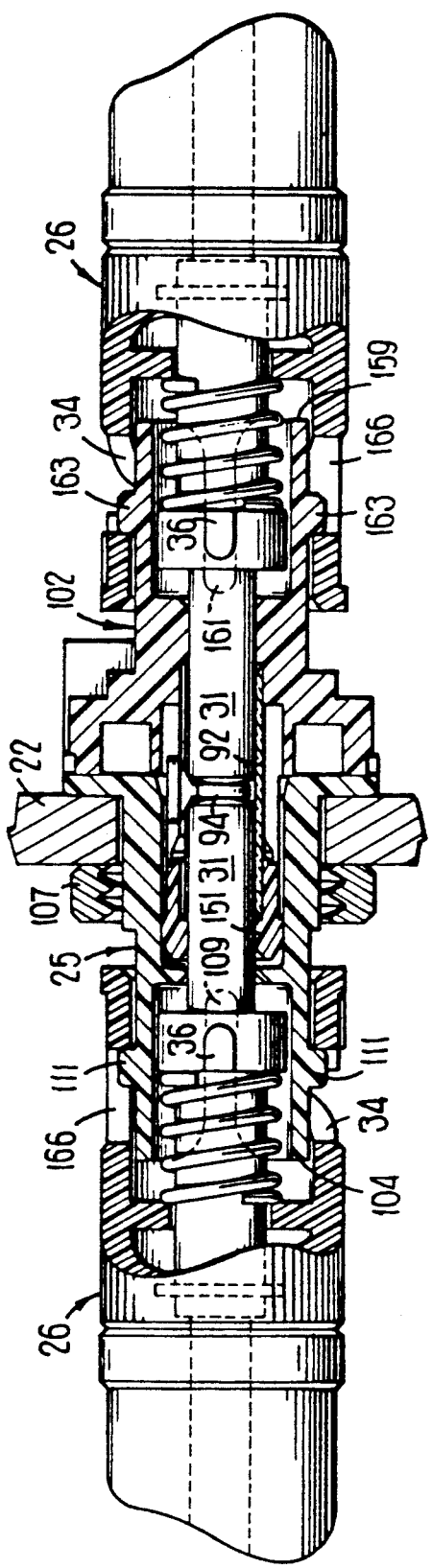
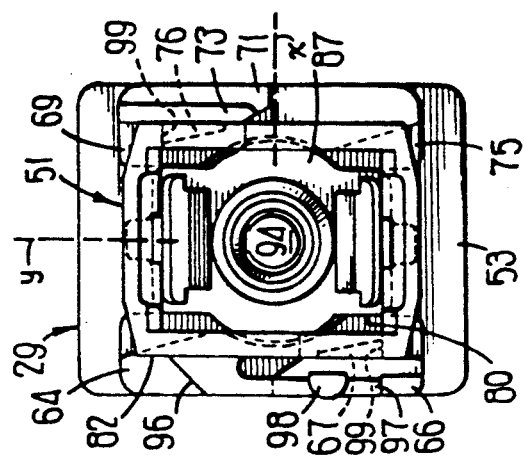
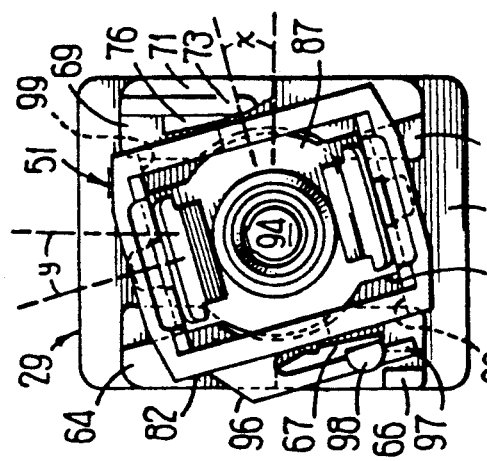

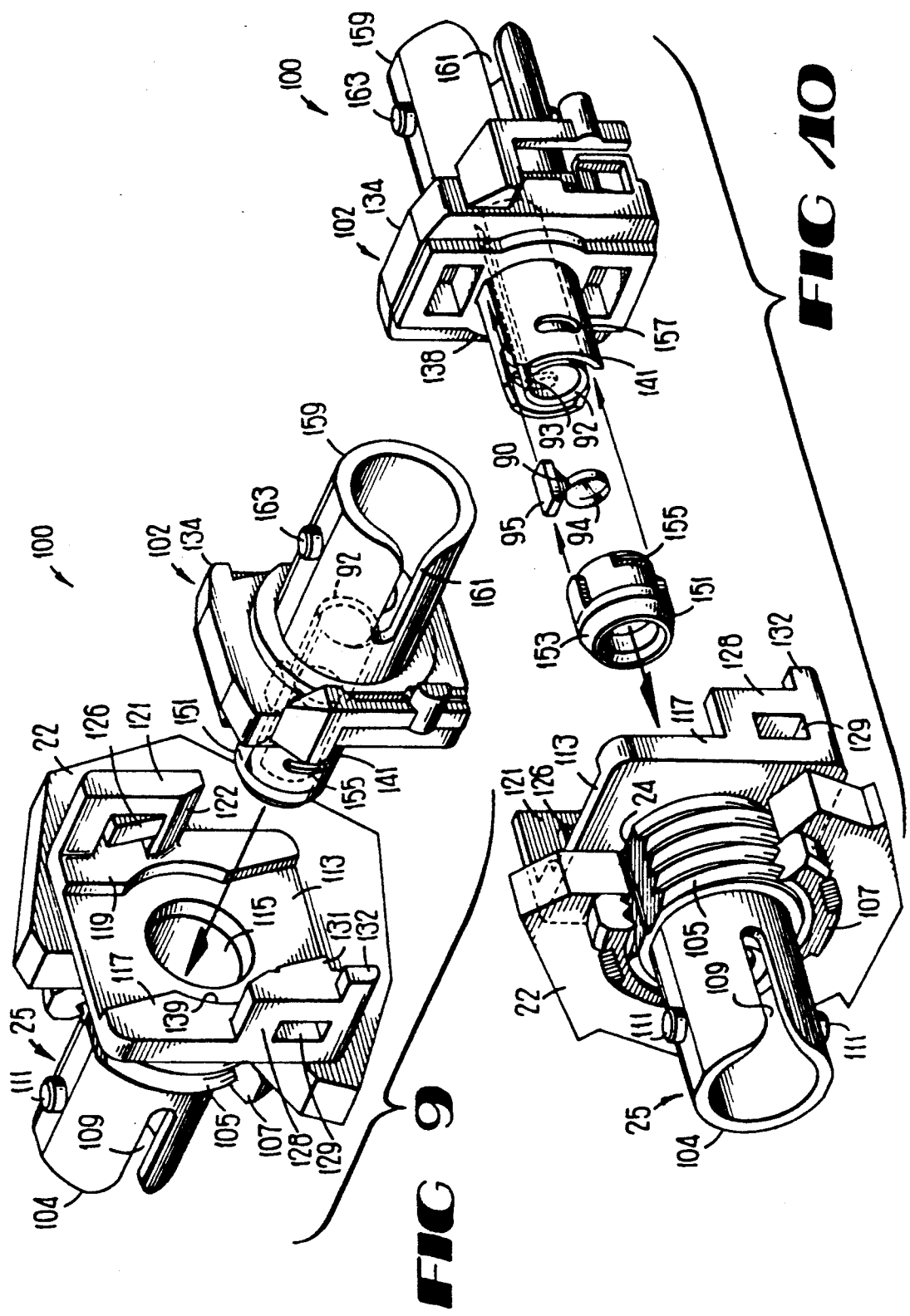

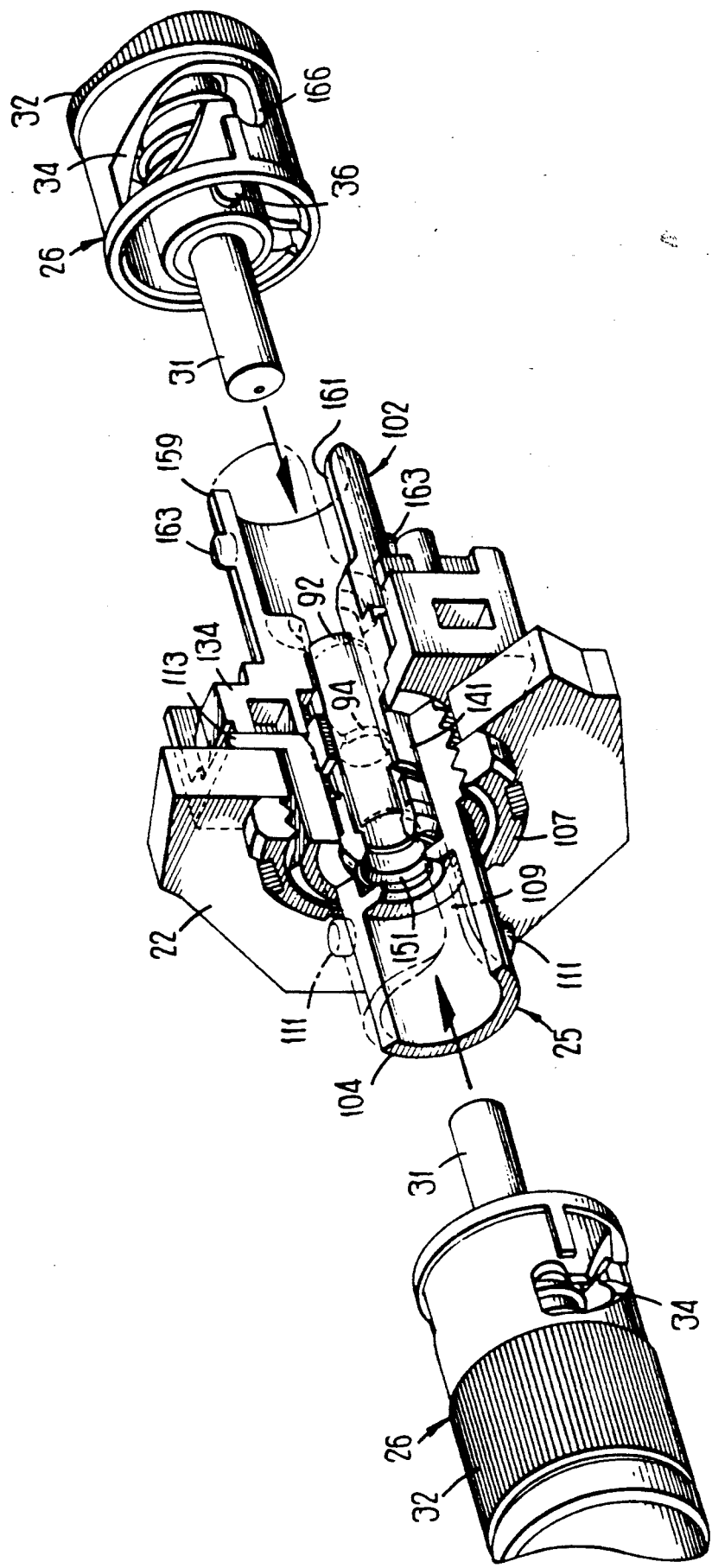

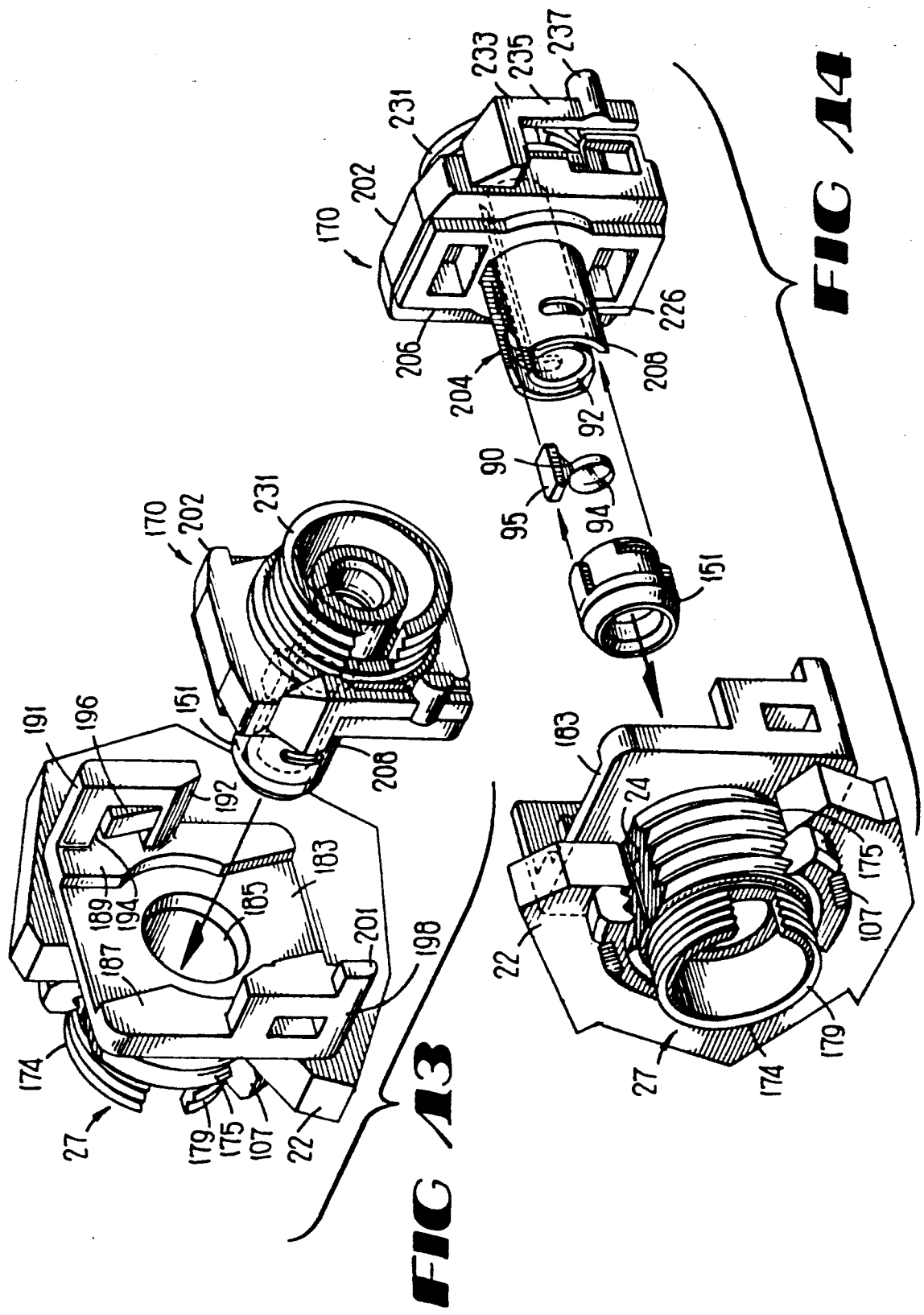

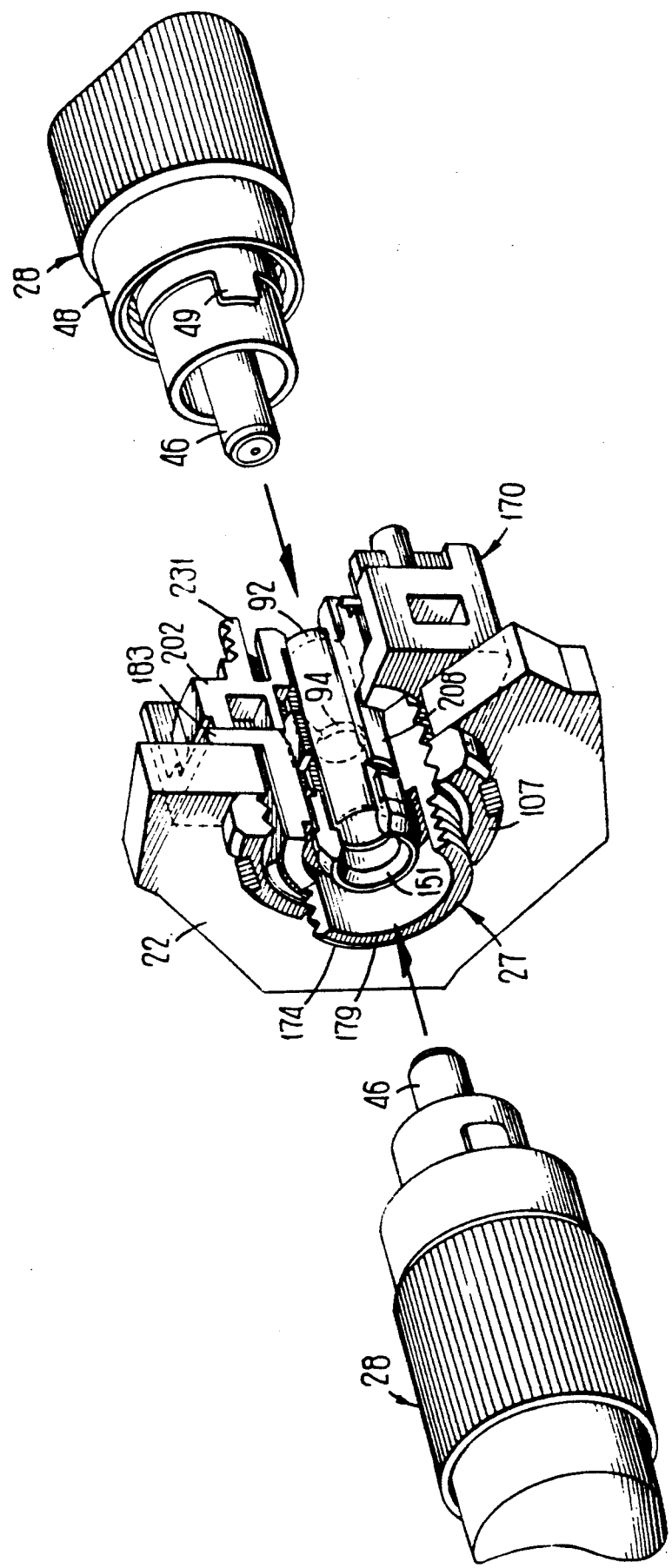

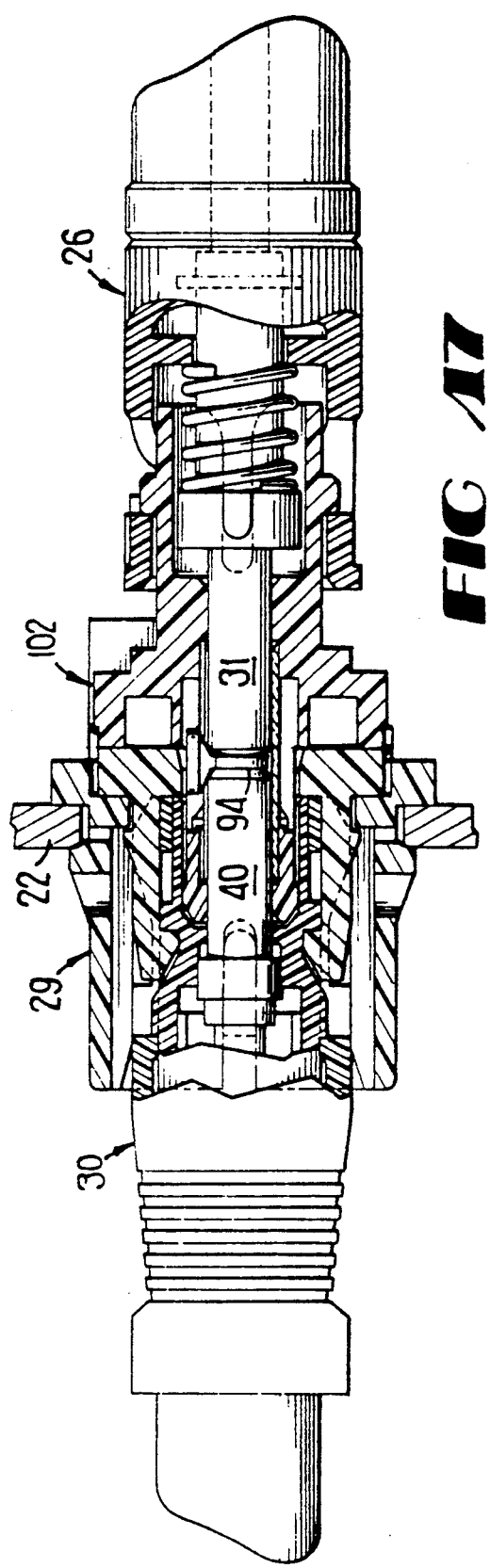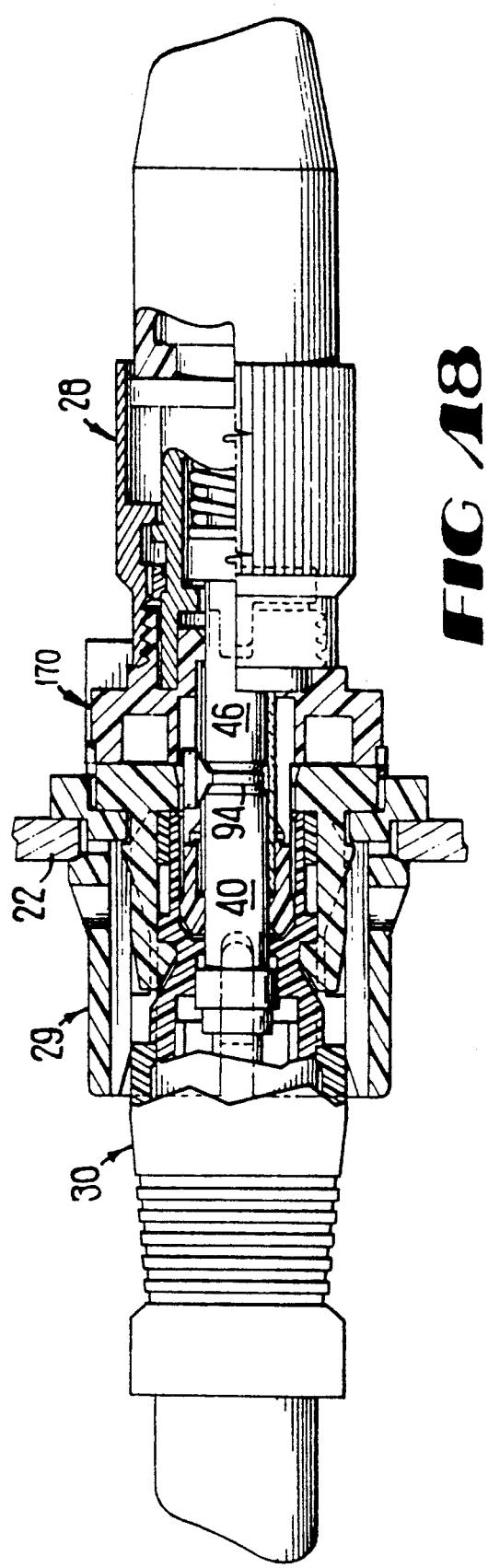

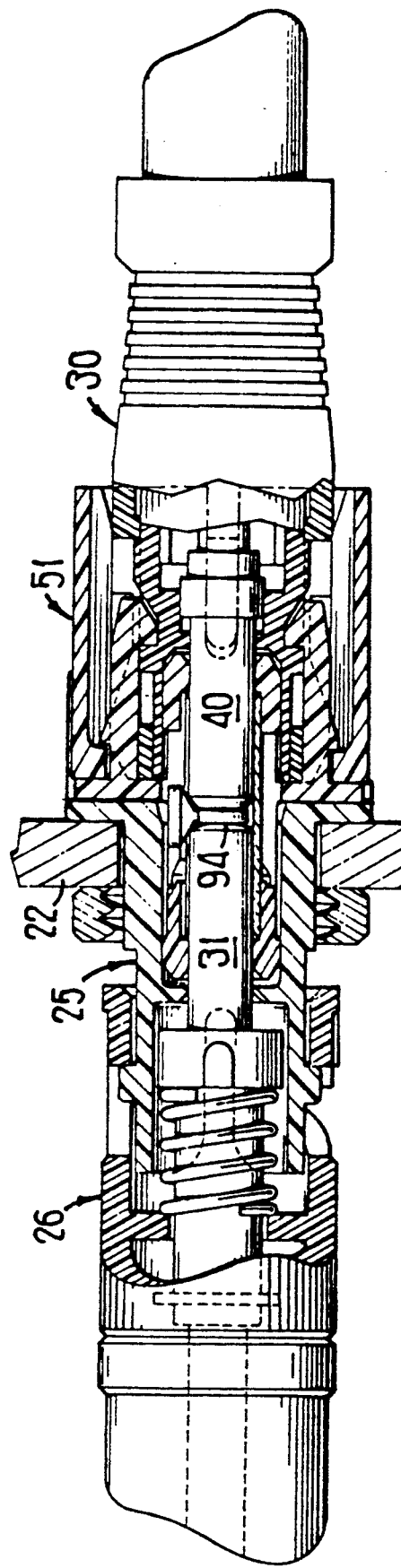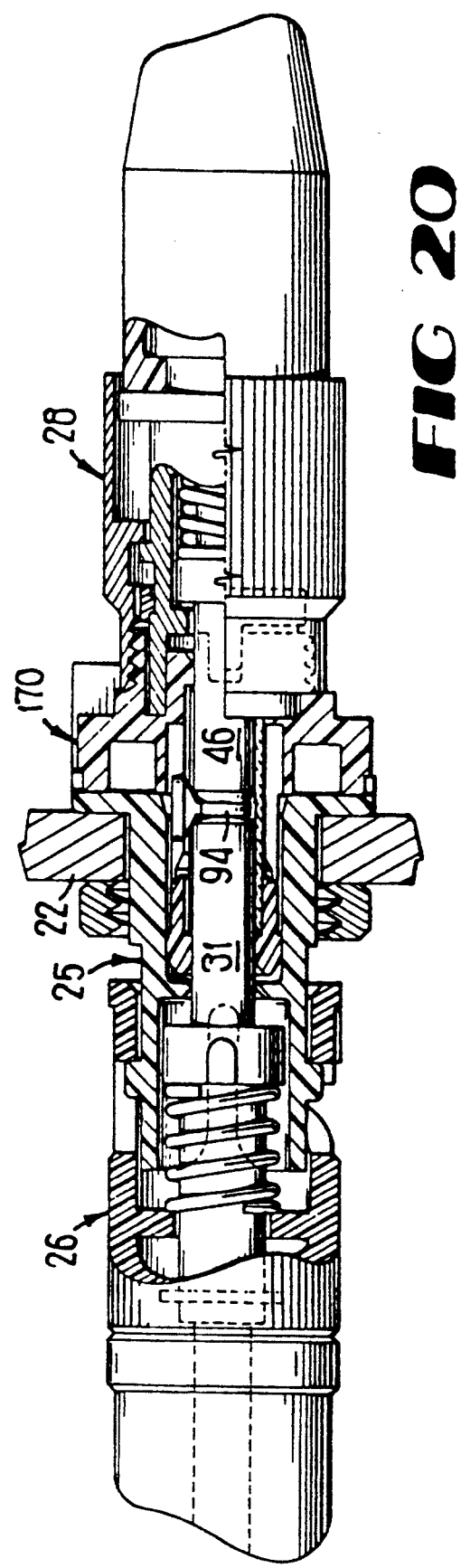

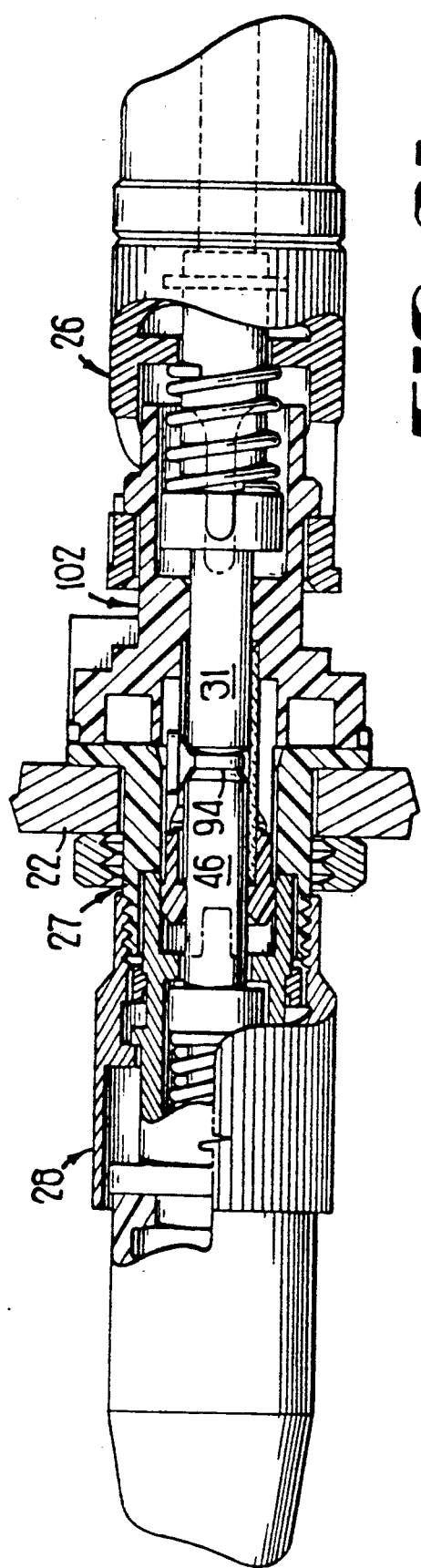
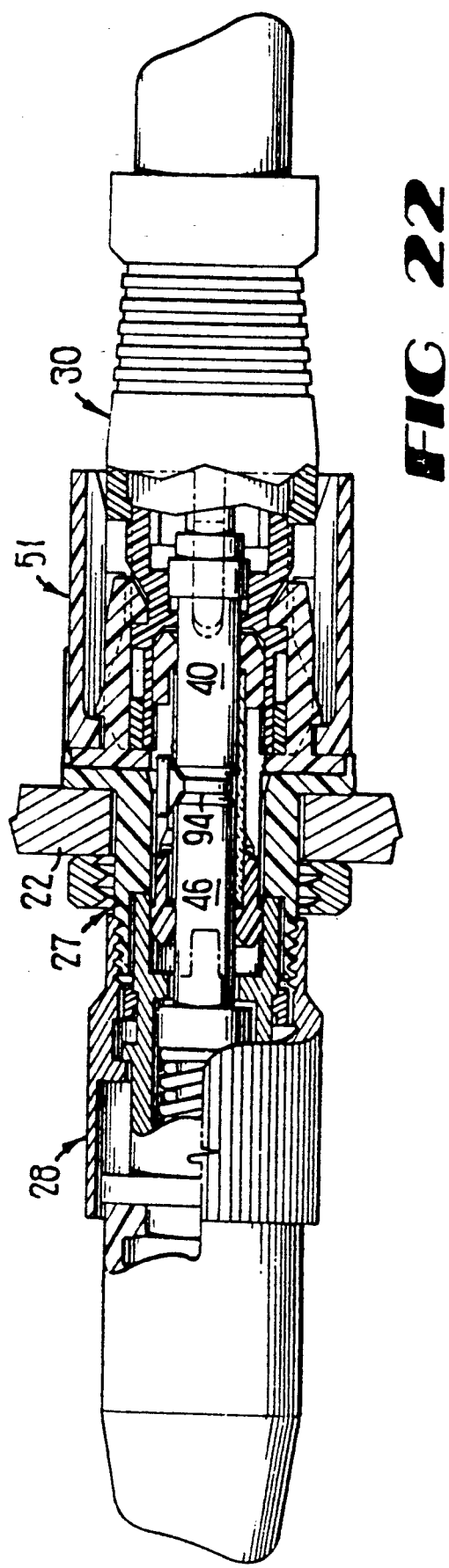

UNIVERSAL OPTICAL FIBER BUILDOUT SYSTEM

TECHNICAL FIELD

This invention relates to a universal optical fiber buildout system. More particularly, it relates to a buildout system which may be used for any one of a plurality of connectors.

BACKGROUND OF THE INVENTION

Connectors for optical fiber transmission systems are known in the art. Often times it becomes necessary to arrange a plurality of optical fiber connectors in a panel to facilitate multifiber connections. Desirably, devices for holding connectors are mounted in the panel but the connectors themselves are not connected to incoming or outgoing fiber paths until needed to provide service. Commonly used devices which are used to accommodate interconnections are referred to as couplings. One kind of coupling which is mounted in a wiring panel is a buildout system which includes a buildout block and a buildout.

A very much used ferrule connector for terminating and connecting two optical fibers is one which is referred to as an ST ® connector, ST being a registered trademark of AT&T. The ST connector is disclosed, for example, in U.S. Pat. No. 4,934,785 which was issued on Jun. 19, 1990 in the names of T. D. Mathis and Calvin M. Miller. Another popular optical fiber connector is one known as the SC connector. An SC connector is connected to another SC connector through a coupling to which each SC connector is assembled by linear motion only. Another ferrule connector is an FC connector. Two FC connectors are placed in optical connection with each other through a coupling. Each FC connector is assembled to the coupling by turning threadably each FC connector onto an externally threaded portion of the coupling.

There are a number of concerns which must be addressed by optical connection arrangements. It is well known to use connector adapters in panels to receive connectors. Coupling components such as buildout blocks may be received in panels to accommodate connectors to be installed at a future time. The capability exists with presently available buildout systems for connecting a first connector which terminates an incoming or outgoing fiber path to a buildout block to await future connection of a second connector which terminates an outgoing or incoming fiber path. It is desired to provide those kinds of arrangements with the expensive portions such as connectors or buildouts installed when needed for customer service.

Another concern arises because buildout blocks in an optical wiring panel may number in the hundreds or even thousands. With close spacing between adjacent ones in order to conserve space, it becomes difficult to perform installation, replacement or connection steps on the connector adapters or buildout blocks at the rear of panel, or for that matter, in the front of the panel.

Also, attenuators often are needed in the transmission path to reduce the strength of an incoming signal to a required level. Many optical fiber communication systems require a method of decreasing optical power at a reducing station to avoid the saturation of receivers. Such a reduction in power may be accomplished by introducing into the system a device known as an attenuator which is designed to dissipate or to attenuate a controlled fraction of the input power while allowing the balance to continue through the system. Such an attenuator is disclosed in U.S. Pat. No. 5,082,345 in the names of R. R. Cammons, A. W. Carlisle and N. R. Lampert.

Further, it would be desirable to have a buildout provided with an attenuator element which may be assembled simply to a buildout block already in the wiring panel. This avoids an investment in apparatus before the time when a fiber path is put into service, yet provides an organized and relatively, inexpensive arrangement for storage of connector plugs which are mounted in buildout blocks when the buildout blocks are mounted in a panel.

Complicating matters for arranging cylindrical ferrule connections which may include attenuating provisions is the recognition that there is no universally accepted ferrule connector. AT&T's ST connector is used widely, as are the hereinbefore mentioned SC and FC connectors. Desirably, a sought-after interconnection arrangement may be used to accommodate all three of the foregoing connectors. What is needed and what does not seem to be available is a buildout interconnection arrangement which may be used in ferrule connecting arrangements, of any combination of ST, FC and SC connectors.

Such a system of buildouts and buildout blocks for ferrule connectors desirably should be one which is capable of accommodating FC and SC connectors as well as ST connectors. Further, the system should be one for which the decision as to which ferrule connector to use may be postponed, if necessary, until the time that service is required on a particular fiber path or paths.

A buildout system which is capable of accommodating ST as well as FC connectors is disclosed in U.S. Pat. No. 5,067,783 which issued on Nov. 26, 1991 in the name of N. R. Lampert. The Lampert system includes a buildout block which includes a tubular portion having a longitudinally extending keyway formed in a wall thereof and extending from a flanged end which includes track and latching means. Also, the buildout block includes first and second cavities which communicate with each other through an opening in an internally disposed wall with the first cavity opening to the flanged end of the buildout block and the second cavity opening to an opposite end thereof. The system also includes a buildout which includes first and second coaxially aligned tubular portions which extend in opposite directions from a flanged portion which includes means adapted to cooperate with the track and latching means of the buildout block to secure the buildout to the buildout block upon suitable relative motion which is caused to occur between the buildout and the buildout block. The first tubular portion is adapted to be received in the first cavity of the buildout block and the second tubular portion includes means for causing one of the ferrules which is inserted into the second tubular portion to become secured therewithin. An alignment sleeve is disposed in the first tubular portion of the buildout and is adapted to receive in one end an end portion of one of the ferrules which becomes disposed in the tubular portion of the buildout block. In an opposite end thereof is received the other one of the ferrules which becomes disposed in the second tubular portion of the buildout to cause an optical connection to be made between the optical fibers terminated by the ferrules. The sleeve includes a longitudinally extending slot in a wall thereof and the key of the at least one ferrule assembly is received in the keyway of the tubular portion of the buildout block. Although the buildout system of U.S. Pat. No. 5,067,783 is capable of accommodating ST and FC connectors, it cannot accommodate the SC connector which has become very popular.

What is needed and what is sought after is a buildout system which is capable of facilitating connections between combinations of ST, SC and FC connectors. Desirably, the sought after buildout system may include provisions for attenuating optical signals.

SUMMARY OF THE INVENTION

The foregoing problems of the prior art have been overcome by the buildout system of this invention. In a preferred embodiment, a buildout system for optical fiber connectors includes a buildout block which may be mounted in a panel and which has a longitudinal axis that extends through the panel. The rear portion of the buildout block is capable of having secured thereto a connector and a front portion thereof is adapted to receive any one of a plurality of different buildouts and having a latching arrangement. In a preferred embodiment, a buildout which is adapted to be assembled to the front portion of the buildout block has a rectangular cross-section normal to the longitudinal axis. The system also includes a buildout, the front portion of which is capable of being secured to a connector and a rear portion adapted to be assembled to the front portion of the buildout block. The buildout is capable of being assembled to any one of a plurality of different buildout blocks and has a latching arrangement which cooperates with the latching arrangement of the buildout block to hold the buildout assembled to the buildout block. The latching arrangement of the buildout block and of the buildout are the same for any combination of the buildout block and buildout.

BRIEF DESCRIPTION OF THE DRAWING

Other features of the present invention will be more readily understood from the following detailed description of specific embodiments thereof when read in conjunction with the accompanying drawings, in which:

FIGS. 2 and 3 are perspective views of a buildout block and a buildout for an SC connector;

FIG. 4 is a perspective view of a buildout system for SC connectors with two SC connectors aligned therewith for connection;

FIG. 5 is an end view of the buildout of FIGS. 2 and 3 as initially inserted into a buildout block;

FIG. 6 is an end view of the buildout of FIGS. 2 and 3 inserted into a buildout block and in a latched position;

FIGS. 9 and 10 are perspective views of a buildout block and of a buildout system for an ST connector;

FIG. 11 is a perspective view of an assembled buildout system for an ST connector, the system including attenuation provisions with two ST connectors aligned for insertion;

FIG. 12 is a front elevational view of a buildout system for ST connectors with the buildout assembled to the buildout block and with an ST connector inserted into each end of the buildout system;

FIGS. 13 and 14 are perspective views of a buildout block and a buildout for FC connectors;

FIG. 15 is a perspective of an FC to FC connector arrangement which includes a buildout block and a buildout;

FIG. 17 is a front elevational view of a buildout system with an SC connector inserted into a buildout block and in optical connection with an ST connector;

FIG. 18 is a front elevational view of a buildout system with an SC connector inserted into a buildout block and in optical connection with an FC connector;

FIG. 19 is a front elevational view of a buildout system with an ST connector inserted into a buildout block and in optical connection with an SC connector;

FIG. 20 is a front elevational view of a buildout system with an ST connector inserted into a buildout block and in optical connection with an FC connector;

FIG. 21 is a front elevational view of a buildout system with an FC connector inserted into a buildout block and in optical connection with an ST connector; and FIG. 22 is a front elevational view of a buildout system with an FC connector inserted into a buildout block and in optical connection with an SC connector.

DETAILED DESCRIPTION

Figure 1:
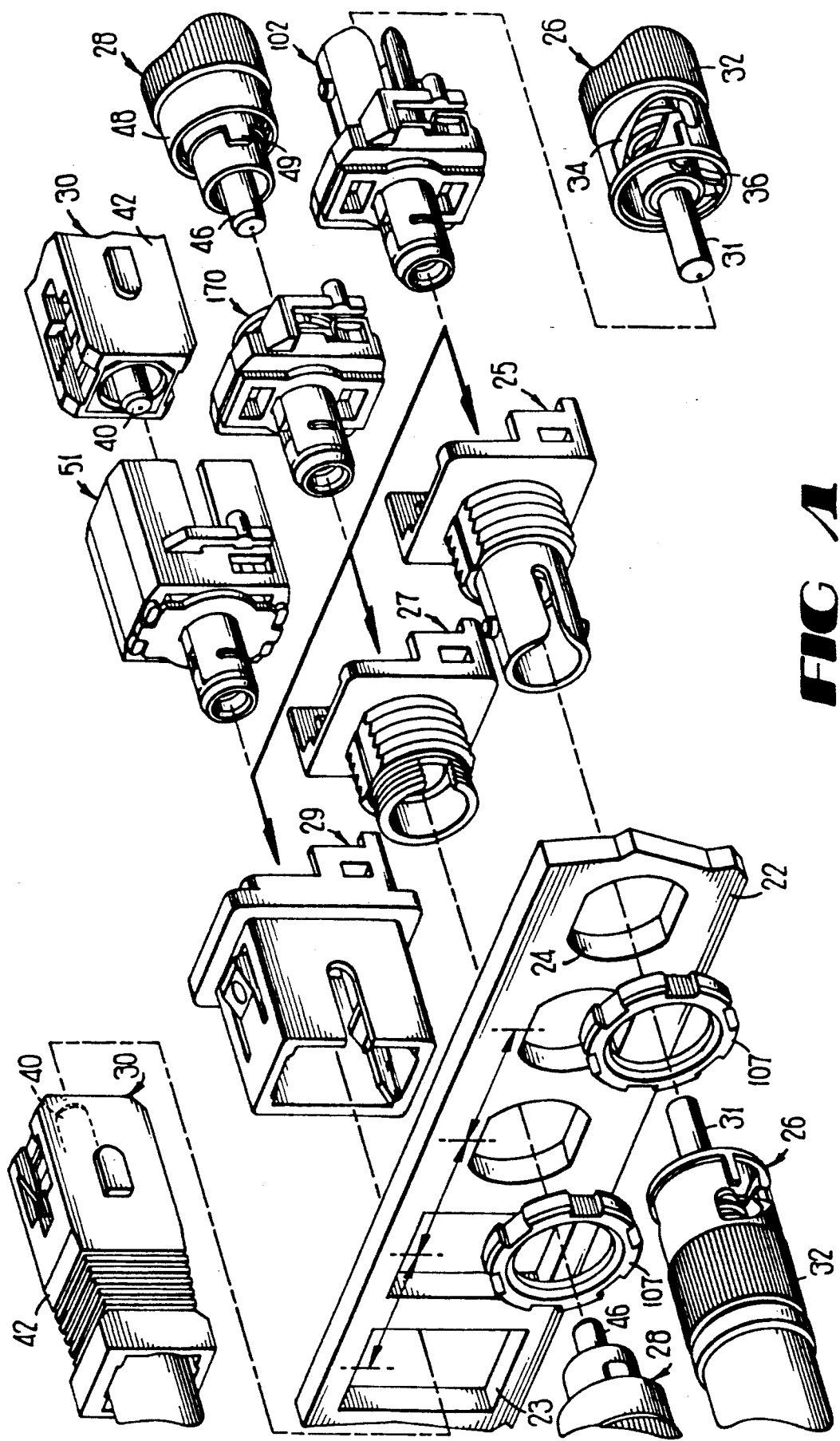
FIG. 1 is a perspective view which depicts buildout systems for three different optical fiber connectors.

Referring now to FIG. 1, there are shown buildout systems which may be used with a panel 22. The panel 22 is provided with an array of openings 23—23 and 24—24 therein. Each opening 24 is adapted to receive either a buildout block 25 which on one side is dedicated to an ST connector 26 or a buildout block 27 which on one side is dedicated to an FC connector 28. Each of the openings 23—23 is adapted to receive a buildout block 29 which on one side is dedicated to an SC connector 30.

The ST connector 26 includes a cylindrical plug or ferrule 31 (see FIG. 1), as it is often called, having a passageway therethrough for receiving an end portion of an optical fiber to be terminated. The plug which is received in a cap 32 is spring-loaded. When two of the plugs are received end-to-end in a coupling sleeve, for example, one or both of the plug bodies is moved along its longitudinal axis during the connection process. In one embodiment, an ST connector is connected to a coupling by what is termed a bayonet motion. In it, the connector is inserted with linear motion into a coupling and turned to cause projecting lugs of the coupling to be moved along camming slots 34—34 of the cap 32 and to cause a pin 36 of the connector to become disposed in a slot 37 of the coupling. In another embodiment (not shown), the connection of the ST connector to the coupling is made by linear motion only.

Another popular optical fiber connector is one known as the SC connector 30. An SC connector includes a ferrule assembly which includes a barrel having a collar at one end and an optical fiber terminating ferrule 40 (see FIG. 1) projecting from the barrel. The ferrule assembly is disposed in a plug frame such that an end portion of the ferrule is biased outwardly from one end of the plug frame by a spring. A strength member retention portion of a cable retention member is disposed over the barrel projecting from the other end. The plug frame is configured so that it may be polarized with respect to a grip 42 into which the plug frame snap-locks. One grip 42 is inserted into one end of a coupling housing and another grip is inserted into another end of the coupling housing to cause the ends of the ferrules to become disposed in optical connection with each other.

The FC connector 28 (see FIG. 1) includes a plug assembly for terminating an optical fiber. The plug assembly includes a cylindrical plug or ferrule 46 which terminates a fiber. The plug is received in a connector body or barrel which is received in a cap 48 that is threaded internally. The cap is adapted to be moved slidably over the barrel and to be turned threadably over the threaded end portion of an FC coupling. The barrel and plug are biased outwardly by a spring. Also, the barrel includes a key 49 which is adapted to be received in a keyway of the threaded end portion.

In FIGS. 2–4 is shown a buildout system for accommodating an SC connector on both the rear and the front sides of a panel plate 22. This is accomplished by using a buildout block 29 and a buildout 51 which are adapted to receive an SC connector 30. What is important is that each of the buildout blocks is capable of having any one of the three buildouts, i.e., the buildouts for the ST, SC and FC connectors, assembled thereto. Further, what is important is that any one of the buildouts may be assembled to any one of the buildout blocks. For example, the SC buildout block may have an SC buildout, an ST buildout or an FC buildout assembled thereto. Also, an SC buildout, for example, may be assembled to an SC, an ST or an FC buildout block. As a result, a buildout system which facilitates connection of different optical connectors is provided.

First to be described is the SC buildout block 29 which is depicted in FIGS. 2 and 3. The SC buildout block 29 comprises housing 52 which may be made of a plastic material which includes a flange 53 adapted to engage on a front face of the panel plate 22. Extending from the flange rearwardly through the opening 23 is a tubular portion 54 which has a rectangular cross section and which includes a slot 55 opening to a free end of the tubular portion.

Upper and lower surfaces 56 and 57 of the tubular portion of the housing includes openings 58—58 in each of which is disposed a depressible latching finger 59. A front portion 60 of the latching finger 59 extends out of the plane of the surface 56 and is spaced from the flange 53. The latching fingers 59—59 are spaced from adjacent portions of the upper and lower surfaces 56 and 57 by slots 61—61. A buildout block 29 is inserted from a front side of the panel 22 which causes the latching fingers to be depressed. As the latching fingers are moved past the panel 22, each finger springs outwardly to lock the buildout block 29 in the panel.

On the other side of the flange and extending from the flange 53 on opposite sides of the flange are extensions 62 and 63. The extension 62 has a stepped configuration. As is seen in FIG. 2, the extension 62 includes a first portion 64, a second portion 65 which projects beyond the first portion and a third portion 66 which extends still further. On an inner surface of the second portion 65 is disposed a wedge-shaped keeper 67 (see FIG. 3).

Going now to an opposite side of the flange, it can be seen in FIG. 3 that the extension 63 is offset and inverted from the extension 62. By inverted is meant that the extension 63 also has a stepped configuration, but the most projecting part of it is adjacent to the top of the buildout block, as viewed in FIG. 3, whereas with the extension 62, the most projecting part was disposed at the bottom. The extension 63 includes a raised first portion 69, a second projecting portion 71 and a third projecting portion 73. The third projecting portion 73 projects the farthest but unlike the most projecting portion for the extension 62, the third projecting portion 73 is interposed between the second projecting portion and a centerline axis of the housing. Also each extension 62 and 63 is provided with a lip 75. A wedge shaped-portion 76 extends inwardly from the extension 63.

The buildout block 29 is adapted to receive a leading end of a grip of an SC connector. For the buildout block 29 to be used for an SC connector on the back side of the panel plate requires that the buildout block be provided with an adapter 78 which is U-shaped and which includes a portion that engages the lips 75—75 and two latching arms 77—77 cantilevered therefrom. The latching arms 77—77 function to latch behind tabs 79—79 (see FIGS. 4 and 7) on opposed sides of the plug frame of the SC connector 30 to hold the SC connector secured to the buildout block.

On the front end of the buildout block is adapted to be disposed the buildout 51 (see FIG. 2). The buildout 51 includes a tubular housing 82 which in end cross section normal to an axis thereof is substantially rectangular. The housing 82 also includes a slot 84 opening to a rear end of the housing. A front-end 86 of the housing is formed to have two opposed lips which project slightly from the two opposed inner surfaces of the housing. On an exterior of each lip are disposed two tabs 88—88. As an adapter 80 having a U-shaped portion is moved into the buildout, oppositely extending ears 89—89 thereof are received between the spaced tabs on the outside of the lips. Projecting from a cross plate 87 of the U-shaped portion is a cylindrical portion 91 which may be received in the circular opening of the adapter disposed in the buildout block 29.

Disposed within the cylindrical portion 91 is an alignment sleeve 92 which is adapted to receive a ferrule of an SC connector which is inserted into the buildout 51. The alignment sleeve 92 is provided with a slot 93 to receive a hangar 90 of an attenuator 94. The hangar 94 depends from a pad 95 which is disposed adjacent to an outer surface of the alignment sleeve.

Attached to one sidewall of the buildout 51 is a latch 96 which includes a cantilevered arm 97. Adjacent to the lower end of the arm 97, as viewed in FIG. 2, a release tab 98 having a semi-circular end cross section projects toward that end of the buildout to which the slot 84 opens. The latch 96 is adapted to cooperate with the third projecting portion 66 to secure the buildout to the buildout block.

An important feature of the invention is the latching arrangement. The same latching arrangement is used on each buildout notwithstanding the particular kind of buildout, i.e. SC, FC., or ST.

FIG. 4 shows the buildout 51 assembled to the buildout block 29. The assembly of the buildout 51 to the buildout block 29 is carried out to cause the cylindrical portion 91 to be inserted into the opening of the buildout block and to become disposed in the tubular portion 54. The last-mentioned step is carried out with an X-axis at the end cross section of the buildout canted slightly to the X-axis of the end cross section of the buildout block (see FIG. 5). The buildout is rotated slightly to cause the wedge-shaped portion 67 of the buildout block to be received in a recess 99 (see FIGS. 2 and 6). At the same time, the cantilvered arm 97 is deflected inwardly by the third projecting portion 66 of the extension 62 to cause the cantilevered arm 97 to become disposed above and latched to the third projecting portion as shown in FIG. 6. The alignment of the buildout and the buildout block is carried out such that the raised portion 87 of the buildout becomes disposed between the raised portions 75 and 64 of the buildout block.

Figure 7:
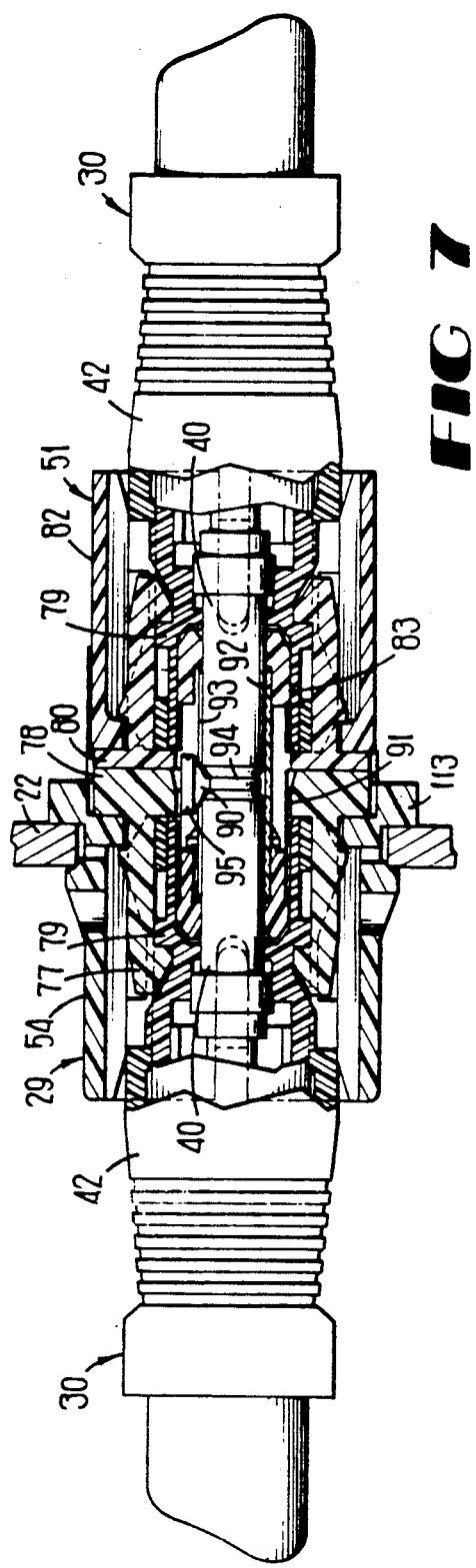
FIG. 7 is a front elevational view of an assembled buildout system for SC connectors with an SC connector inserted into each end thereof.
Figure 8:
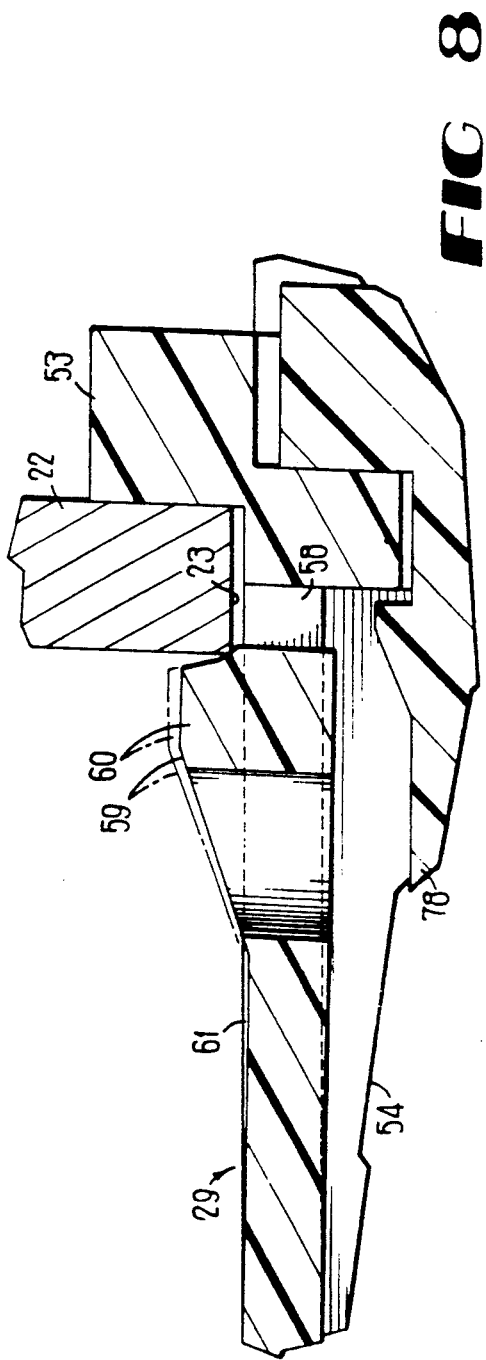
FIG. 8 is a detail view of a portion of an SC buildout block showing panel engagement.

FIGS. 4 and 7-8 show details of the assembly of SC connectors to the buildout block and to the buildout. As is seen in FIG. 4, a grip 42 of an SC connector may be moved into the tubular portion 54 of the buildout block 29 and another grip into the tubular housing 82 of the buildout 51. As a grip 42 is moved into the inner portion of the tubular portion of the buildout block 29, each of the latching arms 77—77 rides upwardly over beveled entry surfaces 101—101 of the grip and latch behind portions of the plug frame. This causes the grip and hence the SC connector to be secured to the buildout (see FIG. 7). The same latching steps are caused to occur when a grip is inserted into the buildout. In the buildout block, a ferrule 40 of the SC connector 30 on the left side of the buildout system, as viewed in FIG. 4, becomes disposed in the cylindrical portion 91 of the buildout whereas in the buildout, a ferrule of an SC connector becomes disposed in a tubular extension 83 (see FIG. 4).

In order to disassemble the buildout from the buildout block, a craftsperson need only apply an inwardly directed force to the release tab 98 to cause the arm 97 to disengage from the top of the third projecting portion 66. This allows the buildout to be turned slightly to allow withdrawal of it from the buildout block.

Referring now to FIGS. 9-10, there is shown a buildout system 100 for ST connectors. As can be seen, the buildout system includes a buildout block 25 and a buildout 102. The buildout block 25 includes a tubular portion 104 and an externally threaded portion 105 which extend through an opening 24 in the panel plate 22. An internally threaded ring nut 107 is turned onto the threaded portion 105 of the buildout block until it engages the panel plate 22 to secure the buildout block to the panel plate. The tubular portion 104 is provided with a slot 109 and oppositely extending lugs 111-111.

Attached to the threaded portion 105 and engaging a front face of the panel plate 22 is a base 113 having a center opening 115. The base 113 includes a raised portion 117 and a raised portion 119. Projecting from the raised portion 119 is a sidewall 121, having a beveled portion 122.

Projecting from the other raised portion 117 is a sidewall 128 which includes an opening 129. The opening 129 also is bounded by a wedge shaped portion 131. Projecting rearwardly from the sidewall 128 is a keeper 132.

The ST buildout block, so named because the portion on the back side of the panel plate 22 is dedicated to receiving an ST connector, is capable of having any of three buildouts assembled thereto on the front side of the panel plate. One of the buildouts accommodates an SC connector 30, another, an ST connector 26 and the third, an FC connector 28. FIGS. 9-12 depict an ST buildout assembled or in assembly position with the ST buildout block.

The ST buildout 102 includes a central portion 134 to which is connected an adapter having a raised portion 138 which is adapted to be received between raised portions 117 and 119 of the base 113. As can be seen, raised portions 138—138 are adapted to be received between curved portions 139—139 of the raised portions 117 and 119 of the buildout block 25 when a cylindrical extension 141 becomes disposed in the tubular portion of the buildout block. Disposed within the cylindrical extension 141 is an alignment sleeve 92 which is adapted to receive a ferrule of an ST connector which is inserted into the buildout block and a ferrule of an ST connector which is inserted into the buildout 102. As in the SC buildout 51, the alignment sleeve 92 is provided with a slot 93 to receive a hangar 90 of an attenuator 94. The hangar 90 depends from a pad 95 which is disposed adjacent to an outer surface of the alignment sleeve.

In order to retain the attenuator 94, the buildout includes a retainer 151 having a chamfered entry 153. The retainer 151 also includes two diametrically opposed tabs 155—155 each of which is adapted to be received in a port 157 in the cylindrical portion 141 to secure the retainer to the buildout.

Extending in an opposite direction from the adapter and central portion 134 is a tubular portion 159. The tubular portion includes a slot 161 which when the buildout is assembled to the buildout block is aligned with the slot 109. Also, the tubular portion 159 is provided with two diametrically opposed lugs 163—163.

As should be apparent, the latching arrangement for securing the buildout 102 of the buildout block is the same as that used for the SC connector used earlier. Further, the assembly of the buildout to the buildout block follows the steps of the assembly of the SC buildout to the SC buildout block.

Going now to FIG. 11, there is depicted an assembled buildout system and two ST connectors positioned to be inserted into portions of the buildout system.

The assembly of an ST connector to the buildout 102 or to the buildout block 25 is carried out to cause the ferrule 31 to become disposed in the alignment sleeve. A craftsperson, in one embodiment, uses linear motion to insert the ferrule into the sleeve after the pin 36 has been aligned with the slot 161 in the buildout and the lugs 163—163 aligned with the entrances to the camming slots. Then the craftsperson turns the ST connector to cause the lugs 163—163 to ride along the camming slots and become disposed in latching slots 166—166 (see FIG. 11). The buildout system together with an ST connector assembled to the buildout block and another ST connector assembled to the buildout is shown in FIG. 12.

Going now to FIGS. 13-14, there are shown views of a buildout system for an FC connector 28. As will be recalled, the FC connector 28 is one which is secured to a coupling, for example, by threadably turning the connector with respect to an externally threaded portion of the coupling. As can be seen, the buildout system for the FC connector includes a buildout block 27 and a buildout 170. The buildout block 27 includes a tubular portion 174 and a first externally threaded portion 175 which extends through an opening 24 in the panel plate 22. An internally threaded ring nut 107 (see also FIG. 1) is turned onto the threaded portion 175 of the buildout block until it engages the panel plate 22 to secure the buildout block to the panel plate.

The back side of the buildout block 27 also is provided with a second externally threaded portion 179 onto which is adapted to turn into the internally threaded portion of an FC connector.

An outer or front portion of the FC buildout block 27 is identical to the front portion of the buildout block 25 of the ST connector. Attached to the threaded portion 175 and engaging a front surface of the panel plate 22 is a base 183 having a center opening 185. The base 183 includes a raised portion 189 and a raised portion 189. Projecting from the raised portion 189 is a sidewall 191 having a beveled portion 192. The sidewall 191 is formed with an opening 194 bounded by a wedge-shaped portion 196. A sidewall 198 projects from the raised portion 187 and includes a wedge-shaped portion 199 and a latching keeper 201.

Again as is seen in FIGS. 13 and 14, the buildout 170 includes a base 202 having an opening into which an adapter 204 is fitted. The adapter 204 includes a raised portion 206 which is contiguous to a surface of the base 202.

Projecting toward the buildout block 27 is a tubular housing 208 having an alignment sleeve 92 (see FIG. 14) disposed therein. The alignment sleeve 92 has a longitudinal slot 93 formed therein through which extends a hangar 90 which supports an attenuator disc 94. The hangar 90 is attached to a pad 95 which is disposed outside the alignment sleeve.

The attenuator disc 94 is held secured in the alignment sleeve 92 by a retention cap 151. The retention cap 151 is formed with a chamfered end 153 on one end thereof and has two diametrically tabs 155—155 projecting from the opposite end thereof. After the attenuator disc 94 is in the alignment sleeve, the retention cap is snap-locked into the tubular housing. The tabs 155—155 snap into openings 226—226 formed in the wall of the tubular housing 208.

The buildout 170 also includes an externally threaded portion 231 which extends in a direction away from the buildout block. An internally threaded portion of an FC connector is adapted to be turned threadably onto the threaded portion 231 after a leading end portion of the ferrule has been inserted into the alignment sleeve to secure the FC connector to the buildout.

The latching arrangement of the buildout 170 and the buildout block 27 is substantially the same as that for the SC and ST connectors. To this end and as can be seen in FIGS. 13 and 14, the buildout includes a latch 233 which includes a cantilevered arm 235 and a release tab 237. After the tubular housing of an FC buildout has been inserted into a buildout block with the X-axis of the buildout canted slightly to that of the buildout block and then turned slightly, the arm 235 is deflected to cause a lower end of the arm 235 to ride up over the lug 201 and seat on a top surface thereof.

Figure 16:
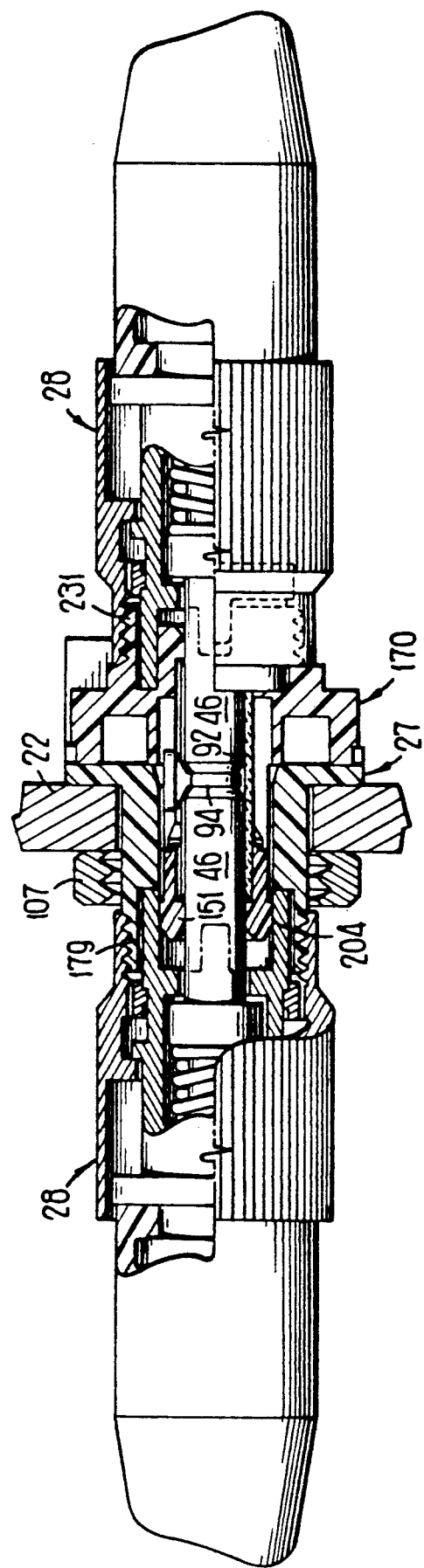
FIG. 16 is a front elevational view of an assembled buildout system with an FC connector inserted into each end thereof.

FIG. 15 depicts an assembled buildout system and two FC connectors aligned therewith and ready to be connected thereto. The left hand FC connector, as viewed in FIG. 15 is moved to cause the ferrule to be inserted into the alignment sleeve and then the barrel of the FC connector is turned to cause its internal threads to be turned onto the threaded portion 179 of the buildout. Then the craftsperson moves the right sided FC connector as viewed in FIG. 15 to the left to insert the ferrule thereof into the alignment sleeve and then turn the barrel onto the threaded portion 231. A buildout system with two FC connectors connected thereto is depicted in FIG. 16.

Going now to FIGS. 17-22, there are shown drawings of buildout systems which interconnect a connector on one side thereof to a different connector on the other side thereof. In each of FIGS. 17-22, the buildout block appears on the left and the buildout on the right. For example, in FIG. 17, an SC buildout block has assembled thereto an ST buildout with SC and ST connectors, respectively, connected thereto. As can be seen, an attenuator disc 94 is disposed between an end of a ferrule 40 of an SC connector and an end of a ferrule 31 of an ST connector.

In FIG. 18, an SC buildout block has an SC connector connected thereto, and an FC buildout has an FC connector turned threadably onto the buildout. FIG. 19 depicts an ST buildout block with an ST connector connected thereto and an SC buildout having an SC connector secured thereto. In FIG. 20 is depicted an ST buildout block and an FC buildout whereas in FIGS. 21 and 22 are depicted FC buildout blocks and ST and SC buildouts, respectively.

Advantageously, the buildout system of this invention is sufficiently small and requires little clearance with adjacent buildout systems of this invention so that center to center spacings of 1.27 cm may be used. This results in an efficient use of space in a panel area and a larger number of buildout arrangements per unit area than has been achieved in the past.

It is to be understood that the above-described arrangements are simply illustrative of the invention. Other arrangements may be devised by those skilled in the art which will embody the principles of the invention and fall within the spirit and scope thereof.

We claim:

1. A buildout system for optical fiber connectors, said buildout system comprising:

a buildout block which has a longitudinal axis, the rear portion of the buildout block being capable of having secured thereto a connector and a front portion thereof being adapted to receive any one of a plurality of different buildouts and having a latching arrangement; and a buildout, having a substantially rectangular cross section in a plane which is normal to the longitudinal axis," the front portion of which is capable of being secured to a connector and a rear portion of which is adapted to be assembled to said front portion of said buildout block, the buildout being capable of being assembled to any one of a plurality of different buildout blocks and having a latching arrangement which rotationally cooperates with the latching arrangement of said buildout block to hold the buildout assembled to said buildout block; the latching arrangement of the buildout block and of the buildout being the same for any combination of buildout block and buildout.

2. The buildout system of claim 1, wherein said front portion of said buildout block includes a latching arrangement which includes diagonally opposed portions.

3. The buildout system of claim 1, wherein said buildout is assembled to said buildout block by moving said buildout in a direction parallel to said longitudinal axis and then turning said buildout about said longitudinal axis to cause said latching arrangement to become effective to secure said buildout to said buildout block.

4. The buildout system of claim 3, wherein Cartesian coordinate X and Y axes are associated with said cross section of said buildout and with a transverse cross section of said buildout block and said buildout prior to being secured to said buildout block is oriented in axial alignment with said buildout block with an X axis of said buildout displaced at an angle to the X axis of the buildout block such that when said buildout is turned to align the X axis of the buildout with the X axis of the buildout block, the latching arrangement becomes effective to secure said buildout to said buildout block.

5. The buildout system of claim 4, wherein said buildout block includes a flange from which extend two diametrically opposed projecting portions in a direction parallel to the longitudinal axis with one of said projecting portions including a latching keeper which extends further in the direction parallel to the longitudinal axis and wherein said buildout includes a supporting frame to one side of which is attached one end of a cantilevered arm having a release tab adjacent to the other end thereof, said arm being capable of being deflected inwardly toward said supporting frame so that when said buildout is moved into engagement with said buildout block and turned, said arm is deflected to allow the other end of said arm to become seated in latching engagement with said keeper, the application of inwardly directed force to said release tab being effective to cause the other end of said arm to be depressed to disengage the other end of said arm from said keeper and allow disassembly of said buildout from said buildout block.

6. The buildout system of claim 5, wherein said supporting frame of said buildout includes an opening therein and wherein said buildout includes an adapter which is adapted to be connected to said supporting frame such that a portion of a tubular housing of said adapter extends through said opening with another portion extending in an opposite direction.

7. The buildout system of claim 6, wherein said adapter includes an alignment sleeve which is disposed in said tubular housing, said alignment sleeve being adapted to receive in each end thereof a ferrule which terminates an end of an optical fiber.

8. The buildout system of claim 7, wherein said alignment sleeve is formed with a longitudinal slot in a wall thereof, wherein said buildout includes an attenuation means comprising an attenuator disc which is supported from a pad by a hangar which extends through said slot of said alignment sleeve, said pad being capable of being moved along said sleeve to accommodate positionining of ferrules which become disposed in said sleeve.

9. The buildout system of claim 8, wherein said tubular housing includes at least one opening forming in a wall thereof adjacent to one end of said tubular housing and wherein said buildout system includes a retention cap which includes at least one detent projecting from a surface of said cap such that when said cap is assembled to an end of said tubular housing, said detent snap-locks into said opening in said wall of said tubular housing to secure said retention cap to said tubular housing.

10. The buildout system of claim 7, wherein said flange of said buildout block includes a tubular portion extending from a side of the flange opposite to that from which said latching arrangement is disposed and having a longitudinal slot formed in a wall thereof and two diametrically opposed pins which project from the wall of said tubular portion, said buildout block also including an externally threaded collar which is disposed about said tubular portion and in engagement with said flange.

11. The buildout system of claim 7, wherein said buildout includes a base having a tubular portion extending therefrom with a longitudinal slot formed in a wall thereof and two diametrically opposed pins projecting from said wall.

12. The buildout system of claim 7, wherein said buildout block includes a tubular portion having a substantially rectangular transverse cross section projecting from a side of said flange opposite to that side from which said latching arrangement is disposed, said buildout block further including two diametrically opposed cantilevered arms which are disposed within said tubular portion, said arms being deflectable to facilitate securing engagement with a connector body which is inserted into said tubular portion.

13. The buildout system of claim 12 wherein said tubular portion having said substantially rectangular transverse cross section includes a latching finger provided in each of two opposed walls thereof, said latching fingers being depressed as the buildout block is inserted into an opening in a panel and moving outwardly to secure said buildout block in said panel when the fingers have been moved past walls which define the opening in the panel.

14. The buildout system of claim 7, wherein said buildout includes a tubular portion having a substantially rectangular transverse cross section projecting from a base portion thereof said buildout further including two cantilevered arms disposed within said tubular portion and capable of being deflected to engage portions of a connector body which is inserted into said tubular portion to secure said connector body to said tubular portion.

15. The buildout system of claim 14, wherein said tubular portion of said buildout block and of said buildout each includes a longitudinally extending slot which is adapted to receive a key of a connector housing which is adapted to be received in the tubular portion of said buildout block and of said buildout.

16. The buildout system of claim 7, wherein said buildout block includes an externally threaded tubular portion extending from said flange and an externally threaded collar which is disposed about said tubular portion and which is in engagement with said flange.

17. The buildout system of claim 7, wherein said buildout includes an externally threaded tubular portion which extends from a base portion thereof in a direction opposite to that in which said tubular housing extends.

* * * * *